United States Patent
Han et al.

(10) Patent No.: US 11,017,015 B2
(45) Date of Patent: May 25, 2021

(54) SYSTEM FOR CREATING INTERACTIVE MEDIA AND METHOD OF OPERATING THE SAME

(71) Applicant: Electronics and Telecommunications Research Institute, Daejeon (KR)

(72) Inventors: Min Ho Han, Daejeon (KR); Sun Joong Kim, Sejong-si (KR); Won Joo Park, Daejeon (KR); Jong Hyun Park, Daejeon (KR); Jeong Woo Son, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 840 days.

(21) Appl. No.: 15/605,282

(22) Filed: May 25, 2017

(65) Prior Publication Data
US 2018/0203855 A1 Jul. 19, 2018

(30) Foreign Application Priority Data
Jan. 17, 2017 (KR) .................... 10-2017-0008102

(51) Int. Cl.
*G06F 16/51* (2019.01)
*G06F 16/54* (2019.01)
(Continued)

(52) U.S. Cl.
CPC .............. *G06F 16/51* (2019.01); *G06F 16/54* (2019.01); *G06F 16/58* (2019.01); *G06F 40/268* (2020.01)

(58) Field of Classification Search
None
See application file for complete search history.

(56) References Cited

U.S. PATENT DOCUMENTS

2008/0304808 A1 12/2008 Newell et al.
2009/0033666 A1* 2/2009 Yasugi .................... G06T 13/00
345/473

(Continued)

FOREIGN PATENT DOCUMENTS

JP          7-219952 A       8/1995
JP          2014-81957 A     5/2014
(Continued)

*Primary Examiner* — Christopher J Raab
(74) *Attorney, Agent, or Firm* — NSIP Law

(57) ABSTRACT

A technology for allowing anyone to easily create interactive media capable of easily recognizing a user interaction by using a stored image is provided. A system according to the present invention includes an image reconstruction server, an image ontology, and an image repository. The image reconstruction server includes an image reconstruction controller, a natural language processing module, and an image search module. The image reconstruction controller of the image reconstruction server receives a scenario based on a natural language from a user and searches for images desired by the user by using the natural language processing module, the image search module, and the image repository. The natural language processing module of the image reconstruction server performs a morphological analysis and a syntax analysis on the scenario input by the user as a preliminary operation for the search of the image ontology. The image search module of the image reconstruction server automatically generates an ontology search query sentence, such as SPARQL, by using a result of natural language processing, and searches the image ontology by using the generated query sentence.

15 Claims, 3 Drawing Sheets

(51) Int. Cl.
    *G06F 16/58*    (2019.01)
    *G06F 40/268*    (2020.01)

(56) References Cited

U.S. PATENT DOCUMENTS

| | | | |
|---|---|---|---|
| 2009/0102834 A1* | 4/2009 | Tomite | G06T 19/00 345/419 |
| 2010/0030552 A1* | 2/2010 | Chen | G06F 16/367 704/9 |
| 2011/0149042 A1 | 6/2011 | Lee et al. | |
| 2012/0017239 A1* | 1/2012 | Ryu | G06Q 30/00 725/32 |
| 2013/0066891 A1* | 3/2013 | Boldyrev | G06F 16/48 707/755 |
| 2013/0166587 A1* | 6/2013 | Berry | G06F 16/48 707/769 |
| 2013/0201188 A1 | 8/2013 | Choi et al. | |
| 2014/0082018 A1* | 3/2014 | Xu | G06F 16/2455 707/770 |
| 2016/0103830 A1* | 4/2016 | Cheong | G06F 16/43 715/738 |

FOREIGN PATENT DOCUMENTS

| | | |
|---|---|---|
| KR | 10-2009-0028123 A | 3/2009 |
| KR | 10-2011-0044419 A | 4/2011 |

\* cited by examiner

FIG. 3

```
prefix rdfs:<http://www.w3.org/2000/01/rdf-schema#>
prefix rdf: <http://www.w3.org/1999/02/22-rdf-syntax-ns#>
prefix etric: <http://etri.rdf.kr/class/>
prefix etrip: <http://etri.rdf.kr/property/>
select ?videoPath ?videoName ?startTime ?endTime ?upperDevideVideo ?indexLabel
where {
{graph <file:/ontobase/etrirdfkr/sceneStore> {
?s <http://etri.rdf.kr/property/comeoutMovieActor> <http://etri.rdf.kr/movieactor/XXX>.
?s <http://etri.rdf.kr/property/comeoutMovieActor> <http://etri.rdf.kr/movieactor/Tom>.
?s <http://etri.rdf.kr/property/comeoutPlace> <http://etri.rdf.kr/place/pub>.
?s <http://etri.rdf.kr/property/comeoutAction> <http://etri.rdf.kr/action/quarrel>.
?s <http://etri.rdf.kr/property/comeoutFood> <http://etri.rdf.kr/food/beer>.
?s etrip:filePath ?videoPath.
?s etrip:videoName ?videoName.
?s etrip:startTime ?startTime.
?s etrip:endTime ?endTime.
?s etrip:upperDevideVideo ?upperDevideVideo.
?s etrip:indexLabel ?indexLabel.
}
}
}
```

SYSTEM FOR CREATING INTERACTIVE MEDIA AND METHOD OF OPERATING THE SAME

CROSS-REFERENCE TO RELATED APPLICATION

This application claims priority to and the benefit of Korean Patent Application No. 10-2017-0008102, filed on Jan. 17, 2017, the disclosure of which is incorporated herein by reference in its entirety.

BACKGROUND

1. Field of the Invention

The present invention relates to a technology for creating interactive media capable of recognizing a user interaction by reusing image content. More particularly, this invention relates to a system for creating interactive media capable of providing a user with a multi-modal interface and recognizing a user interaction by reusing image content through a natural language-based user scenario analysis, and a method of operating the same.

2. Discussion of Related Art

A multi-modal interface is a recognition-based technology that interprets and encodes information about a keyboard, a pen, and speech, gestures, gaze, hand movements, and behavior patterns of a human to achieve communication between the human and a machine. By another definition, a multi-modal interface refers to a technology for simultaneously allowing inputs/outputs of a plurality of modalities in a human-computer interaction process and for exchanging mutual intentions through a combination of the plurality of modalities and an integrated interpretation of input signals, in other words, a computer interface technology for exchanging various ways of human expression.

Currently, a skilled worker needs to capture images with an expensive equipment and create media using a professional editing program to create media (e.g., interactive media) providing an interactive function, by using a multi-modal interface. However, interactive media created as such is only available in a particular device and particular place. Accordingly, in businesses, a technology for allowing anyone to easily create interactive media capable of recognizing a user interaction using an existing image based only on a scenario is needed.

SUMMARY OF THE INVENTION

In order to solve the above problem, the inventors have developed a technology for allowing anyone to easily create interactive media capable of easily recognizing a user interaction by reusing a stored image.

The present invention is directed to provide a configuration of a system for creating interactive media which is capable of recognizing a user interaction by reusing stored image content, and a method of operating the system. The present invention is directed to provide a user authoring tool for creating interactive media which is capable of recognizing a user interaction through a multi-modal user interface (UI).

The technical objectives of the inventive concept are not limited to the above disclosure, and other objectives may become apparent to those of ordinary skill in the art based on the following descriptions.

To achieve the above-described objectives, according to a first characteristic of the present invention, a system for creating interactive media includes an image reconstruction server, an image ontology, and an image repository.

The image reconstruction server includes an image reconstruction controller, a natural language processing module, and an image search module. The image reconstruction controller may receive a scenario based on a natural language from a user and searches for images desired by the user by using the natural language processing module, the image search module, and the image repository.

The natural language processing module of the image reconstruction server may perform a morphological analysis and a syntax analysis on the scenario input by the user as a preliminary operation for the search of the image ontology.

The image search module of the image reconstruction server may automatically generate an ontology search query sentence, such as SPARQL, by using a result of natural language processing, and search the image ontology by using the generated ontology query sentence.

According to a second characteristic of the present invention, a method of operating a system for creating interactive media includes: inputting, by a user, a scenario based on a natural language; searching, by an image reconstruction server, for images in units of scenes based on the user scenario; selecting, by the user, and reconstructing desired images among the found images; inserting, by the user, a user interaction between the images; and uploading the finally reconstructed images to an image repository.

Before the system is operated, the method may include storing, by a system administrator, previously collected image content divided in units of scenes in the image repository, and constructing an image ontology configured to search for a stored divided scene.

In the uploading of the finally reconstructed images to the image repository, scenes found according to the user scenario may not be stored again, but an index of the found scene and an index of a user interaction between the found scenes may be stored.

According to a third characteristic of the present invention, an authoring tool may include a user scenario input unit, a scene search result output unit, a user interaction insertion unit, and an image reconstruction unit.

The user scenario input unit may input a scenario for a user to create interactive media into the authoring tool in units of scenes. A search result of each scene of the scenario input by the user may be output on the scene search result output unit of the authoring tool. The user may check each scene on the scene search result output unit of the authoring tool by selecting and replaying the scene, and may move a finally selected scene to the image reconstruction unit of the authoring tool through a drag or the like.

The user may insert a user interaction between scenes on the image reconstruction unit of the authoring tool by using a symbol on the user interaction insertion unit of the authoring tool. Also, the user may insert a user interaction between scenes that are finally selected through the image reconstruction unit of the authoring tool, thereby reconstructing an image. Finally, according to a fourth characteristic of the present invention, an image reconstruction server may be connected to an image repository in which collected image content divided in units of scenes is stored, an image ontology configured to search for a divided scene stored in the image repository, and a UI, and may include an image reconstruction controller configured to receive an interactive media scenario based on a natural language which is input in a plurality of units of scenes from the UI, search the image ontology according the scenario to fetch images desired by a user from the image repository, reconstruct the images according to the user scenario, and store the reconstructed images in the image repository.

The image reconstruction controller may further include a module configured to transport an image, which is found according to the user scenario by using a natural language processing module and an image processing module, to the user.

The image reconstruction controller may further include a module configured to insert an interactive function between each scene of a scenario constructed by the user.

The image reconstruction server may further include the natural language processing module configured to perform a morphological analysis and a syntax analysis on the scenario input by the user as a preliminary operation for the search of the image ontology; and the image search module configured to generate an ontology search query sentence by using a result of natural language processing of the natural language processing module, and search the image ontology by using the generated ontology search query sentence.

The natural language processing module may further include a module configured to separate a morpheme, which is a minimally meaningful unit, from the scenario input by the user, and a module configured to attach an appropriate part of speech according to a grammatical function of each of morpheme.

The image search module may extract an entity, a relationship, and an event by searching for an optimized syntax analysis tree among a plurality of syntax analysis trees that are generated as a result of the natural language processing, and generate RDF Triple which maps a relation between entities by using an image ontology stored in a form of RDF (resource description framework).

The structure and operation of the present invention described above will become apparent by reference to detailed embodiments described in conjunction with the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 3 is a simple protocol and resource description framework query language (SPARQL) query sentence generated as an example.

DETAILED DESCRIPTION OF EXEMPLARY EMBODIMENTS

Figure 1:
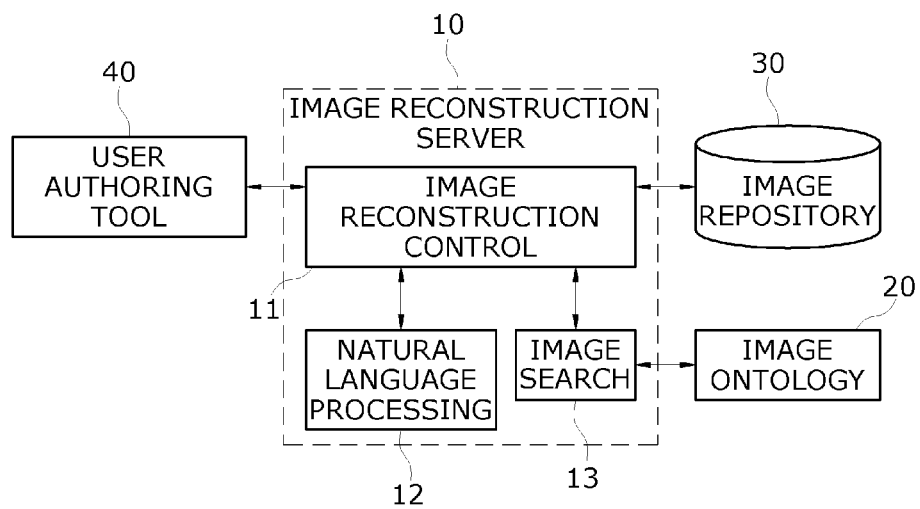
FIG. 1 is a block diagram illustrating a system for creating interactive media according to the present invention.

Hereinafter, exemplary embodiments of the present invention will be described with reference to the accompanying drawings so as to clarify the technical idea of the present invention. A structure of a system for creating interactive media according to the present invention is illustrated in FIG. 1.

The system includes an image reconstruction server 10, an image ontology 20, and an image repository 30. The image reconstruction server 10 serves to receive a user scenario based on a natural language, and search the image ontology 20 to fetch an image from the image repository 30. In order to operate the system according to the present invention, a system administrator (not shown) divides previously collected image content, prior to the operation of the system, into units of scenes, stores the divided content in the image repository 30, and constructs the image ontology 20 to search for the stored divided scenes. Accordingly, when operating the system according to the present invention, a user may search for a scene desired by the user, that is, a scene in accordance with a scenario.

The image reconstruction server 10 includes an image reconstruction controller 11, a natural language processing module 12, and an image search module 13. The image reconstruction controller 11 serves to receive a natural language-based scenario from a user (the user inputs a natural language-based scenario constructed in units of scenes by using an authoring tool, which will be described later, to create interactive media), and to transport an image, which is found according to the user scenario by using the natural language processing module 12 and the image search module 13, to the user. Also, the image reconstruction controller 11 serves to insert an interactive function between each scene of the scenario constructed by the user and store finally reconstructed images in the image repository 30.

The natural language processing module 12 serves to separate a morpheme, which is a minimally meaningful unit, from the scenario input by the user, to attach an appropriate part of speech according to a grammatical function of each morpheme, and to restore a prototype of a word if required.

The image search module 13 serves to extract an entity, a relationship, and an event by searching for an optimized syntax analysis tree among a plurality of syntax analysis trees that are generated as a result of natural language processing by the natural language processing module 12, and it serves to generate RDF Triple which maps a relation between entities by using the image ontology 20 stored in the form of RDF (resource description framework). Also, the image search module 13 serves to automatically generate an ontology search query sentence, such as "simple protocol and RDF query language (SPARQL)" by using the RDF Triple, and to allow the image reconstruction controller 11 to search the image repository 30 for a scene according to the scenario.

Figure 2:
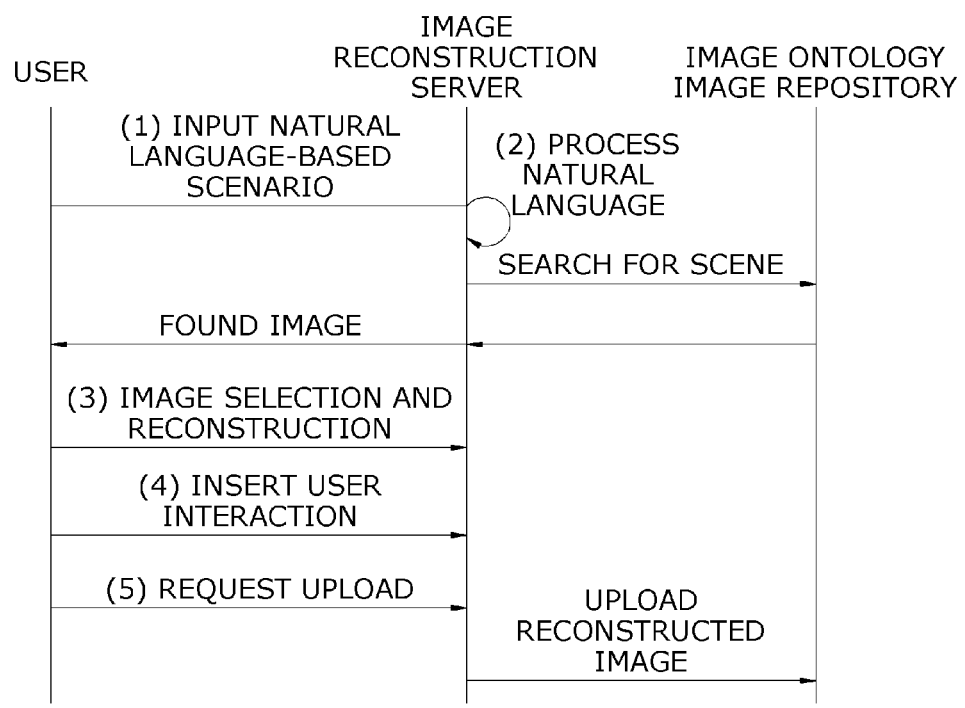
FIG. 2 is a flowchart showing a method of operating a system for creating interactive media according to the present invention.

A method of operating the system for creating interactive media according to the present invention is illustrated as follows with reference to FIG. 2.

1. A user inputs a natural language-based scenario in units of scenes to create interactive media. For example, natural language-based sentences for "Scene 1, Scene 2, . . . , and Scene N" are provided in the image reconstruction server 10 (for example, in the image reconstruction controller 11) in order for the user to create interactive media including N scenes.

2. The image reconstruction server 10 performs natural language processing on the sentences for the respective scenes (for example, by using the image reconstruction controller 11), and searches the image ontology 20 and the image repository 30 for scenes corresponding to the respective sentences based on the result of the natural language processing (for example, using the image search module 13).

3. A plurality of images may be found with respect to one sentence for each of the scenes, and in this case the user selects a desired image among the found images and disposes, according to a flow of the scenario, the images found for the respective scenes. That is, reconstruction is performed.

4. The user inserts a user interaction between each of the scenes by using the image reconstruction server 10 so that the reconstructed images are replayed according to the user interaction.

5. When the user requests that the image reconstruction server 10 to upload the reconstructed images having the user interaction inserted thereinto to the image repository 30, the image reconstruction server 10 uploads the requested reconstructed images to the image repository 30.

When the reconstructed images having the user interaction function inserted thereinto are uploaded (e.g. stored) to the image repository 30 in response to the request of the user, the image reconstruction server 10 does not store the images of scenes found according to the user scenario, but store an index of the found scenes and an index of an interaction between each of the scenes. For example, in the case the images reconstructed according to the user scenario include a scene 'S1' and a scene 'S4' and a user interaction 'I3' for a connection between the scenes is a gesture of the user waving his or her hand, an index 'S1-I3-S4' is stored in the image repository 30. Later, the user may request the image reconstruction server 10 to replay interactive media configured by the index 'S1-I3-S4' through various cross platforms. Thereby, the image reconstruction server 10 fetches the image S1 from the image repository 30 and replays the image S1, and then replays the image S4 when the interaction I3 is input through a cross platform.

A detailed operation example of a user reconstructing images through the image reconstruction server 10 will be described as follows.

If a user inputs a scenario (a sentence) in a unit of scene through a user interface (UI) provided by the image reconstruction controller 11 to search for a scene corresponding to the sentence "XXX (a person's name) has a quarrel with Tom about the beer at the pub.", the image reconstruction controller 11 calls the natural language processing module 12 to perform natural language processing on that sentence, and transports the sentence "XXX (a person's name) has a quarrel with Tom about the beer at the pub." to the natural language processing module 12.

The natural language processing module 12 performs natural language processing on the received sentence, and a result of the analysis of "XXX(noun), has(verb), a(indefinite article), quarrel(noun), with(preposition), Tom(noun), about (preposition), the(definite article), beer(noun), at(preposition), the(definite article), pub(noun), .(period)" to the image reconstruction controller 11.

The image reconstruction controller 11 transports the received result of analysis to the image search module 13, and the image search module 13 extracts nouns, adjectives, and verbs that are meaningful in the received analysis result this case, "XXX," "has," "quarrel," "Tom," "beer," and "pub") generates a SPARQL query sentence as shown in FIG. 3, and searches the image ontology 20 by using the generated SPARQL query sentence. And it transports a result of the search (e.g. a location in which an image is stored) to the image reconstruction controller 11.

The image reconstruction controller 11 fetches an image from the image repository 30 by using the search result (e.g. the location in which the image is stored) transmitted from the image search module 13 and displays the image to the user through a UI. The process is repeated for the number of scenes of a scenario desired to be constructed by the user.

Figure 4:
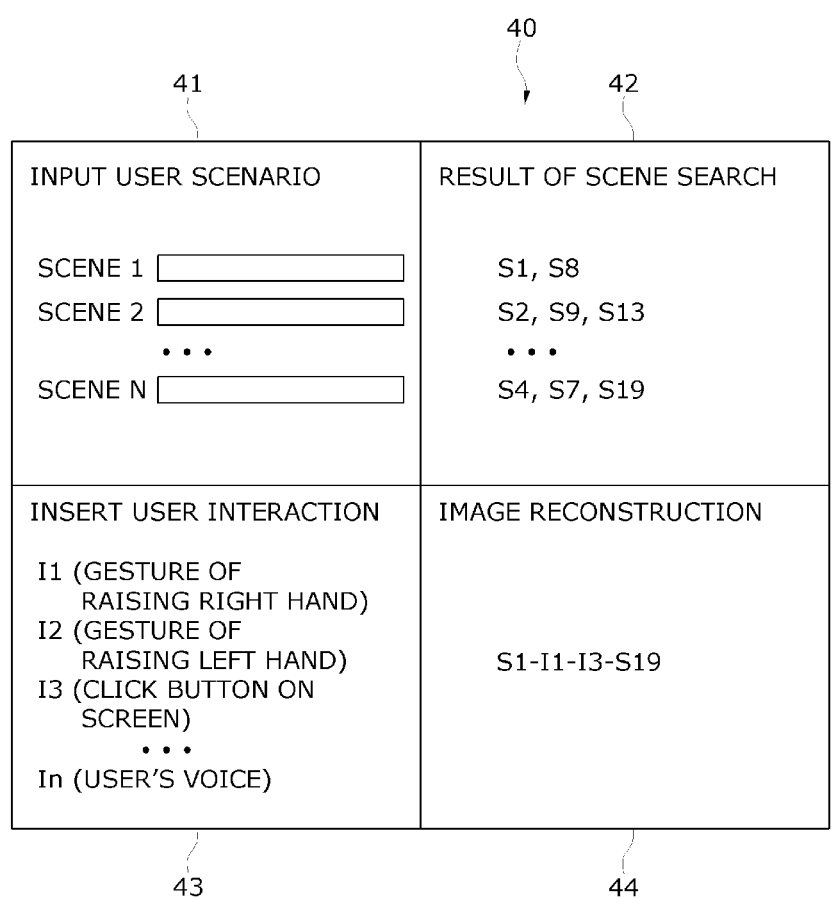
FIG. 4 is a diagram illustrating a configuration of a screen of a user authoring tool for creating interactive media according to FIG. 1 or FIG. 2.

Meanwhile, a user authoring tool for creating interactive media according to the present invention s configured as in FIG. 4 which illustrates a configuration of a user authoring tool from the perspective of a UI thereof. A user may access the image reconstruction server 10 through the UI via the Web or a dedicated app.

The user authoring tool 40 for creating interactive media includes a user scenario input unit 41, a scene search result output unit 42, a user interaction insertion unit 43, and an image reconstruction unit 44.

A user inputs a user scenario for creating interactive media in units of scenes (e.g. to the image reconstruction controller 11 shown in FIG. 1) through the user scenario input unit 41, and a result image found with respect to each of the input scenes is displayed on the scene search result output unit 42. In an example shown in FIG. 4, images S1 and S8 are displayed with respect to a natural language-based sentence of a scene 1 and images S2, S9 and S13 are displayed with respect to a natural language-based sentence of a scene 2, through the scene search result output unit 42.

The user may check the images displayed on the scene search result output unit 42 by selecting and replaying each of the images, and may move finally selected images to the image reconstruction unit 44 by dragging or the like. The user inserts various user interactions provided on the user interaction insertion unit 43 between each of the images of the scenes existing on the image reconstruction unit 44 through e.g., dragging to create interactive media. Referring to the example shown in FIG. 4, images S1, S9, and S19 are selected in accordance with a user scenario, and an interaction I1 is inserted between the images S1 and S9, and an interaction I3 is inserted between the images S9 and S19.

The user authoring tool may further include a function of providing a user with an emulator for checking and testing the created interactive media and a function of uploading the completed interactive media.

As should be apparent from the above, when creating interactive media capable of recognizing a user interaction, there is no need of high cost image capturing according to a user scenario and no need of expertise in creating interactive media through a professional editing program. Even an unskilled user can create interactive media capable of recognizing a user interaction by simply inputting a scenario and easily editing the input scenario through a multi-modal interface.

An interactive media creating system according to the present invention, an image reconstruction server used therefor, a method of operating the interactive media creating system, and a user authoring tool for creating interactive media have been described above through exemplary embodiments of the present invention. However, those skilled in the art should appreciate that the scope of the present invention is not limited by the exemplary embodiments and the accompanying drawings, the scope of protection of the present invention should be construed on the basis of the accompanying claims, and it should be construed that all of the technical ideas included within a scope equivalent to the claims belong thereto.

What is claimed is:

1. A processor-implemented system for creating interactive media, the system comprising:
    an image repository in which collected image content divided in units of scenes is stored;
    an image ontology repository constructed to search for a divided scene stored in an image repository; and an image reconstruction server, including processors and an image reconstruction controller, configured to:
receive a user scenario based on a natural language which is input in units of scenes from a user interface (UI), the user scenario being constructed by a user;
generate an ontology search query sentence by using a result of natural language processing and search the image ontology repository by using the generated ontology search query sentence;
fetch images desired by the user from the image repository by searching the image ontology repository according to the user scenario;
reconstruct the fetched images using the user scenario to create the interactive media, the user scenario comprising a sequence of plural scenes and plural interactive functions; and
store the reconstructed images in the image repository,
wherein the image reconstruction server is further configured to generate a resource description framework (RDF) Triple which maps a relation between entities by using an image ontology stored in a form of RDF.

2. The system of claim 1, wherein the image reconstruction server including the processors is further configured to perform a morphological analysis and a syntax analysis on a scenario input by the user as a preliminary operation for the search of the image ontology repository.

3. The system of claim 2, wherein the image reconstruction controller is configured to transport an image, which is found according to the user scenario to the user.

4. The system of claim 2, wherein the image reconstruction controller is further configured to insert an interactive function between each scene included in the user scenario constructed by the user.

5. The system of claim 2, wherein the image reconstruction server including the processors is further configured to:
separate a morpheme, which is a minimally meaningful unit, from the scenario, and
attach an appropriate part of speech according to a grammatical function of each morpheme.

6. The system of claim 2, wherein the image reconstruction server including the processors is configured to extract an entity, a relationship, and an event by searching for an optimized syntax analysis tree among a plurality of syntax analysis trees that are generated as a result of the natural language processing.

7. A method of operating a processor-implemented system for creating interactive media comprising an image repository, an image ontology repository, an image reconstruction server, and a user interface (UI), the method comprising:
receiving, by the image reconstruction server, a user scenario based on a natural language from the UI, the user scenario being constructed by a user and input in units of scenes;
performing natural language processing on a sentence for each of the received scenes, and searching for a scene with respect to each sentence in the image ontology repository and the image repository based on a result of the natural language processing;
performing, by the image reconstruction server, a morphological analysis and a syntax analysis on a scenario input by a user as a preliminary operation for a search of the image ontology repository;
extracting, by the image reconstruction server, an entity, a relationship, and an event by searching for an optimized syntax analysis tree among a plurality of syntax analysis trees that are generated as the result of the natural language processing;
reconstructing, by the UI and using the user scenario, images found with respect to the sentences for the respective scenes, the user scenario comprising a sequence of plural scenes and plural interactive functions; and
when the UI requests that the image reconstruction server upload the reconstructed images to the image repository, uploading, by the image reconstruction server, the reconstructed images requested by the user to the image repository and saving the reconstructed images in the image repository.

8. The method of claim 7, wherein the reconstructing of the images by the UI according to the user scenario further includes inserting a user interaction between each of the scenes so that the reconstructed images are replayed according to the user interaction.

9. The method of claim 8, wherein when the reconstructed images having the user interaction inserted therebetween are uploaded to the image repository according to a request of the user, an index of the found scenes and an index of an interaction between the found scenes are stored in the image reconstruction server.

10. An image reconstruction processor-implemented server for creating interactive media, connected to an image repository in which collected image content divided in units of scenes is stored, an image ontology repository constructed to search for a divided scene stored in the image repository, and a user interface (UI), the image reconstruction processor-implemented server comprising processors and an image reconstruction controller configured to:
receive an interactive media scenario based on a natural language which is input in units of scenes from the UI, the user scenario being constructed by a user;
perform a morphological analysis and a syntax analysis on a scenario input by a user as a preliminary operation for a search of the image ontology repository;
extract an entity, a relationship, and an event by searching for an optimized syntax analysis tree among a plurality of syntax analysis trees that are generated as a result of the performed morphological analysis and syntax analysis;
search the image ontology repository according the scenario to fetch images desired by the user from the image repository;
reconstruct the fetched images according to the user scenario to create the interactive media, the user scenario comprising a sequence of plural scenes and plural interactive functions; and
store the reconstructed images in the image repository.

11. The image reconstruction processor-implemented server of claim 10, wherein the image reconstruction processor-implemented server is further configured to:
generate an ontology search query sentence by using a result of the performed morphological analysis and syntax analysis, and
search the image ontology repository by using the generated ontology search query sentence.

12. The image reconstruction processor-implemented server of claim 11, wherein the image reconstruction controller is further configured to transport the images, which are found and fetched according to the user scenario, to the user.

13. The image reconstruction processor-implemented server of claim 11, wherein the image reconstruction controller is further configured to insert an interactive function between each scene of the user scenario constructed by the user.

14. The image reconstruction processor-implemented server of claim 11, wherein the image reconstruction processor-implemented server is further configured to:
  separate a morpheme, which is a minimally meaningful unit, from a scenario input by the user, and
  attach an appropriate part of speech according to a grammatical function of each of morpheme.

15. The image reconstruction processor-implemented server of claim 11, wherein the image reconstruction processor-implemented server is configured to generate a resource description framework (RDF) Triple which maps a relation between entities by using an image ontology stored in a form of RDF.

* * * * *